(12) United States Patent
Choi et al.

(10) Patent No.: US 7,486,024 B2
(45) Date of Patent: Feb. 3, 2009

(54) DISPLAY APPARATUS FILTER AND PLASMA DISPLAY APPARATUS USING THE SAME

(75) Inventors: Chul Chae Choi, Bucheon-si (KR); Youngjoo Yee, Seongnam-si (KR); Hyouk Kwon, Seoul (KR); Sang-Cheon Kim, Goyang-si (KR)

(73) Assignee: LG Electronics Inc., Seoul (KR)

( * ) Notice: Subject to any disclaimer, the term of this patent is extended or adjusted under 35 U.S.C. 154(b) by 266 days.

(21) Appl. No.: 11/560,795

(22) Filed: Nov. 16, 2006

(65) Prior Publication Data
US 2007/0108881 A1    May 17, 2007

(30) Foreign Application Priority Data

| Nov. 17, 2005 | (KR) | ............ 10-2005-0110235 |
| Jan. 25, 2006 | (KR) | ............ 10-2006-0007633 |
| Jan. 25, 2006 | (KR) | ............ 10-2006-0007642 |

(51) Int. Cl.
*H01J 17/49* (2006.01)

(52) U.S. Cl. ............... 313/587; 313/113
(58) Field of Classification Search ........ 313/111, 313/113, 587
See application file for complete search history.

(56) References Cited

U.S. PATENT DOCUMENTS 6,483,238 B1 * 11/2002 Baret et al. .......... 313/582

\* cited by examiner

*Primary Examiner*—Vip Patel
(74) *Attorney, Agent, or Firm*—Fish & Richardson P.C.

(57) ABSTRACT

A display apparatus filter and a plasma display apparatus using the same are disclosed. The display apparatus filter includes a light transmission unit and a light absorption unit. The light transmission unit has a plurality of holes. The plurality of holes each have gradually increasing opening area as the filter goes from its front surface to its rear surface. The light absorption unit is formed on the parts other than the part where the plurality of holes are formed in the front surface of the filter.

20 Claims, 8 Drawing Sheets

(a)

(b)

(a)          (b)

DISPLAY APPARATUS FILTER AND PLASMA DISPLAY APPARATUS USING THE SAME

This Nonprovisional application claims priority under 35 U.S.C. §119(a) on Patent Application Nos. 10-2005-0110235 filed in Korea on Nov. 17, 2005, 10-2006-0007633 and 10-2006-0007642 filed in Korea on Jan. 25, 2006 the entire contents of which are hereby incorporated by reference.

BACKGROUND

1. Field

This document relates to a display apparatus filter and a plasma display apparatus using the same.

2. Description of the Related Art

In general, a plasma display apparatus comprises a plasma display panel for displaying images using plasma discharge and a display apparatus filter disposed on the front surface of the plasma display panel.

A plasma display panel generally comprises a front panel and a rear panel. Barrier ribs formed between the front panel and the rear panel define unit discharge cells. Each of the unit discharge cells is filled with an inert gas containing a main discharge gas such as neon (Ne), helium (He) or a Ne—He gas mixture and a small amount of xenon (Xe). The plurality of unit discharge cells constitute a single pixel. For example, a red cell, a green cell, and a blue cell are gathered to constitute a pixel.

When a high frequency voltage is applied to the unit discharge cells to generate a discharge, the discharged inert gas radiates vacuum ultraviolet rays. These ultraviolet rays excite phosphors formed between the barrier ribs to display images.

At this time, a filter with prescribed functions is arranged on the front surface of the display panel to further improve the quality of images. This filter has been studied continuously.

SUMMARY

Accordingly, an object of the present invention is to solve at least the problems and disadvantages of the background art.

In one aspect, a display apparatus filter comprises a light transmission unit having a plurality of holes, the plurality of holes each having gradualy increasing opening area as the filter goes from its front surface to its rear surface, and a light absorption unit formed on the parts other than the part where the plurality of holes are formed in the front surface of the filter.

In another aspect, a plasma display apparatus comprises a plasma display panel, and a display apparatus filter of claim 1, the display apparatus filter provided at a front surface of the plasma display panel.

In still another aspect, a display apparatus filter comprises a light transmission unit having a plurality of holes thereon, each having the shape of a truncated cone or a prismoid and having gradually increasing opening area as the filter goes from its front surface to its rear surface, a light absorption unit formed on the parts other than the part where the plurality of holes are formed in the whole surface of the filter, and a transparent resin for filling an inside of the holes.

BRIEF DESCRIPTION OF THE DRAWINGS

The embodiment of the invention will be described in detail with reference to the following drawings in which like numerals refer to like elements.

DETAILED DESCRIPTION OF PREFERRED EMBODIMENTS

Figure 1:
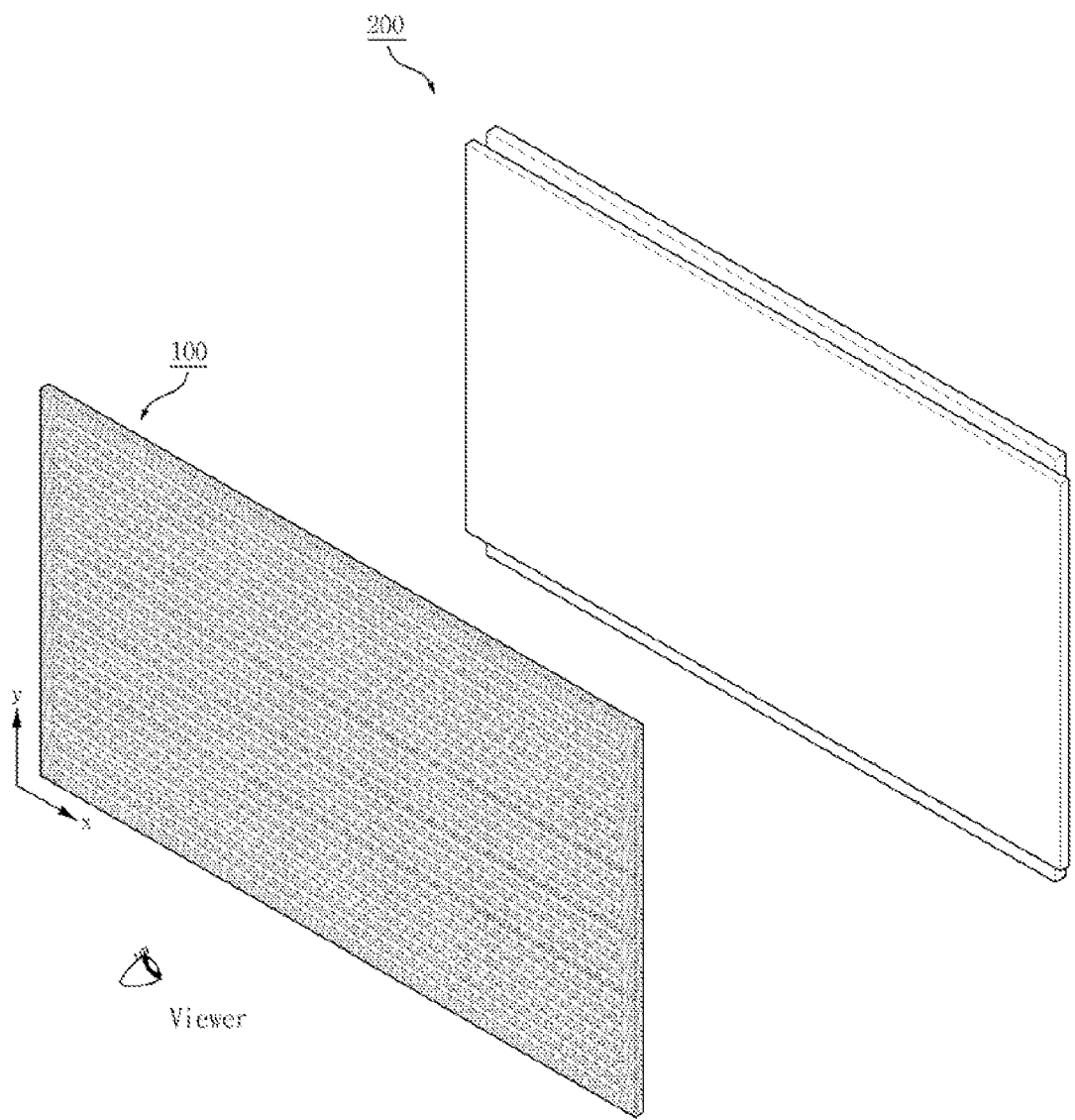
FIG. 1 is a view of illustrating a construction of a plasma display apparatus according to an embodiment of the present invention.

Preferred embodiments of the present invention will be described in a more detailed manner with reference to the drawings.

A display apparatus filter comprises a light transmission unit having a plurality of holes, the plurality of holes each having gradualy increasing opening area as the filter goes from its front surface to its rear surface, and a light absorption unit formed on the parts other than the part where the plurality of holes are formed in the front surface of the filter.

A reflective film may be provided on an inner surface of the plurality of the holes.

The reflective film may comprise a metallic thin film.

The reflective film may be formed of any one of Cu, Ag, or Al.

The area of the light absorption unit may decrease as the filter goes from its front surface to its rear surface.

The display apparatus filter may further comprise a resin part provided between the outer surface of the plurality of holes and the light absorption unit.

The display apparatus filter may further comprise a transparent resin for filling the inside of the holes.

A refractive index of the transparent resin may be greater than that of the light absorption unit.

Each each hole may have a circular section.

Each hole may have a rectangular section.

At least one or more of a near-infrared blocking film, a color correction film, a anti-reflection film, or electronic wave interference blocking film may be provided on the front surface or rear surface of the filter.

A boundary surface of each hole may be angled by more than 65 degrees and less than 85 degrees with respect to a reference surface of the filter.

An an opening area of the front surface of the filter may be more than 1/30 and less than 1/5 of that of its rear front.

The light absorption unit may be formed of any one of a black paint, a black resin, carbon black, a conductive black polymer or a melanized metal.

A width of each hole may be more than 1 μm and less than 900 μm.

A plasma display apparatus comprises a plasma display panel, and a display apparatus filter of claim 1, the display apparatus filter provided at a front surface of the plasma display panel.

A reflective film may be provided on an inner surface of the plurality of holes.

A display apparatus filter comprises a light transmission unit having a plurality of holes thereon, each having the shape of a truncated cone or a prismoid and having gradually increasing opening area as the filter goes from its front surface to its rear surface, a light absorption unit formed on the parts other than the part where the plurality of holes are formed in the whole surface of the filter, and a transparent resin for filling an inside of the holes.

A reflective film may be provided on an inner surface of the plurality of holes.

An opening area of the front surface of the filter may be more than 1/30 and less than 1/5 of that of its rear front.

Hereinafter, exemplary embodiments of the present invention will be described in detail with reference to the attached drawings.

FIG. 1 is a view of illustrating a construction of a plasma display apparatus according to an embodiment of the present invention.

As shown in FIG. 1, the plasma display apparatus according to the embodiment of the present invention may comprise a plasma display panel 200 and a display apparatus filter 100.

The plasma display panel 200 comprises a plurality of electrodes, e.g. scan electrodes Y, sustain electrodes Z, and address electrodes X. Driving units provided on a driving circuit substrate (not shown) apply a driving voltage to these electrodes to create a discharge, thereby displaying images. These structures will be detailed later with reference to FIG. 4.

The display apparatus filter 100 is disposed at the front surface of the panel 200 and comprises a light transmission unit and a light absorption unit, each of which is disposed over the whole surface of the filter 100. The light transmission unit has a plurality of holes arranged thereon, each of which has gradually increasing opening area as the filter 100 goes from its front surface to the rear surface. The light absorption unit is formed on the parts other than the part where the plurality of holes are positioned. The light transmission unit of the filter according to an embodiment of FIG. 1 may comprise holes, each having a rectangular shape, which are arranged in the shape of stripes in the horizontal direction of the panel 200, i.e. in the x-axis direction. The structure of this display apparatus filter 100 will be detailed later with reference to FIG. 4.

Figure 2A:
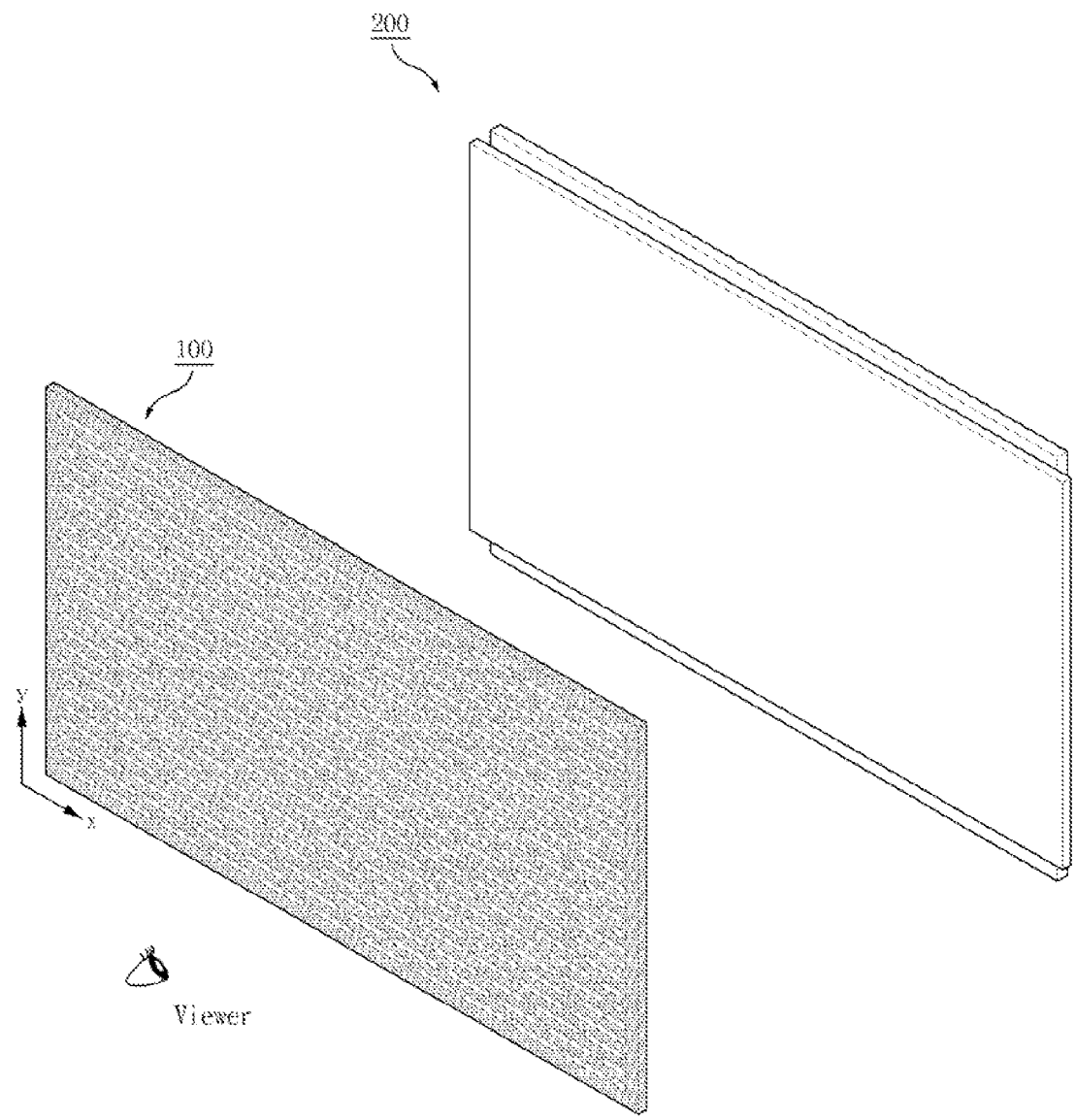
FIGS. 2a and 2b each are a view of illustrating a construction of a plasma display apparatus according to another embodiment of the present invention.
Figure 2B:
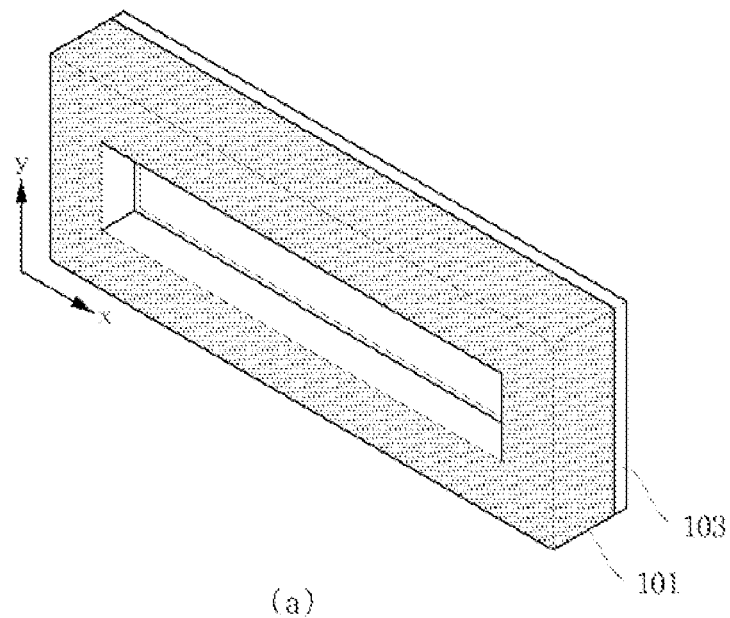
Figure 2B:
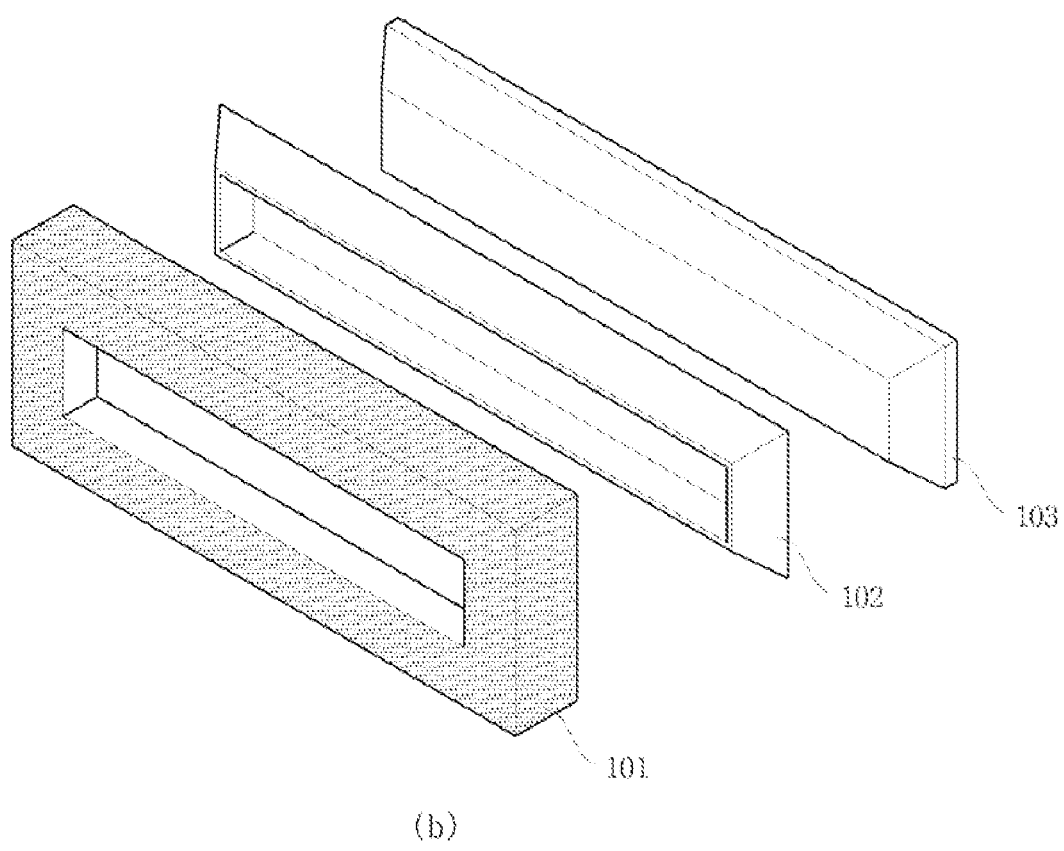

FIGS. 2a and 2b each are a view of illustrating constructions of a plasma display apparatus according to another embodiment of the present invention.

As shown in FIG. 2a, the plasma display apparatus according to another embodiment of the present invention may comprise a plasma display panel 200 and a display apparatus filter 100.

The plasma display panel 200 comprises a plurality of electrodes and driving units as described above. The driving units apply a driving voltage to these electrodes to create a discharge, thereby displaying images.

The display apparatus filter 100 is disposed at the front surface of the panel 200 and comprises a light transmission unit and a light absorption unit, each of which is disposed over the whole surface of the filter 100. The light transmission unit has a plurality of holes arranged thereon, each of which has gradually increasing opening area as the filter 100 goes from its front surface to its rear surface. The light absorption unit is formed on the parts other than the part where the plurality of holes are positioned. The light transmission unit of the filter according to the embodiment of FIG. 2a may comprise a plurality of holes, each having a rectangular section, which are arranged in the horizontal direction of the panel 200, i.e. in the x-axis direction. FIG. 2b shows a unit light transmission unit on which these holes are formed.

As can be seen through FIG. 2b(a), in the display apparatus filter 100, a plurality of unit light transmission units are arranged to be spaced from each other by a prescribed distance, and the unit transmission unit has a plurality of holes thereon, each of which has gradually increasing opening area as the filter 100 goes from its front surface to its rear surface. These holes may be filled with a transparent material, e.g. transparent resin 103. The light absorption unit 101 is provided on the parts other than the part where the holes are formed on the front surface of the filter 100 to be capable of preventing external light from reflecting. In addition, a reflective film 102 may be formed on the inner surface of the hole to be able to improve the transparency of images to be displayed by a display apparatus. The reflective film 102 can be formed of a metallic thin film, which may comprise any one of, e.g., Cu, Ag, or Al.

Figure 3:
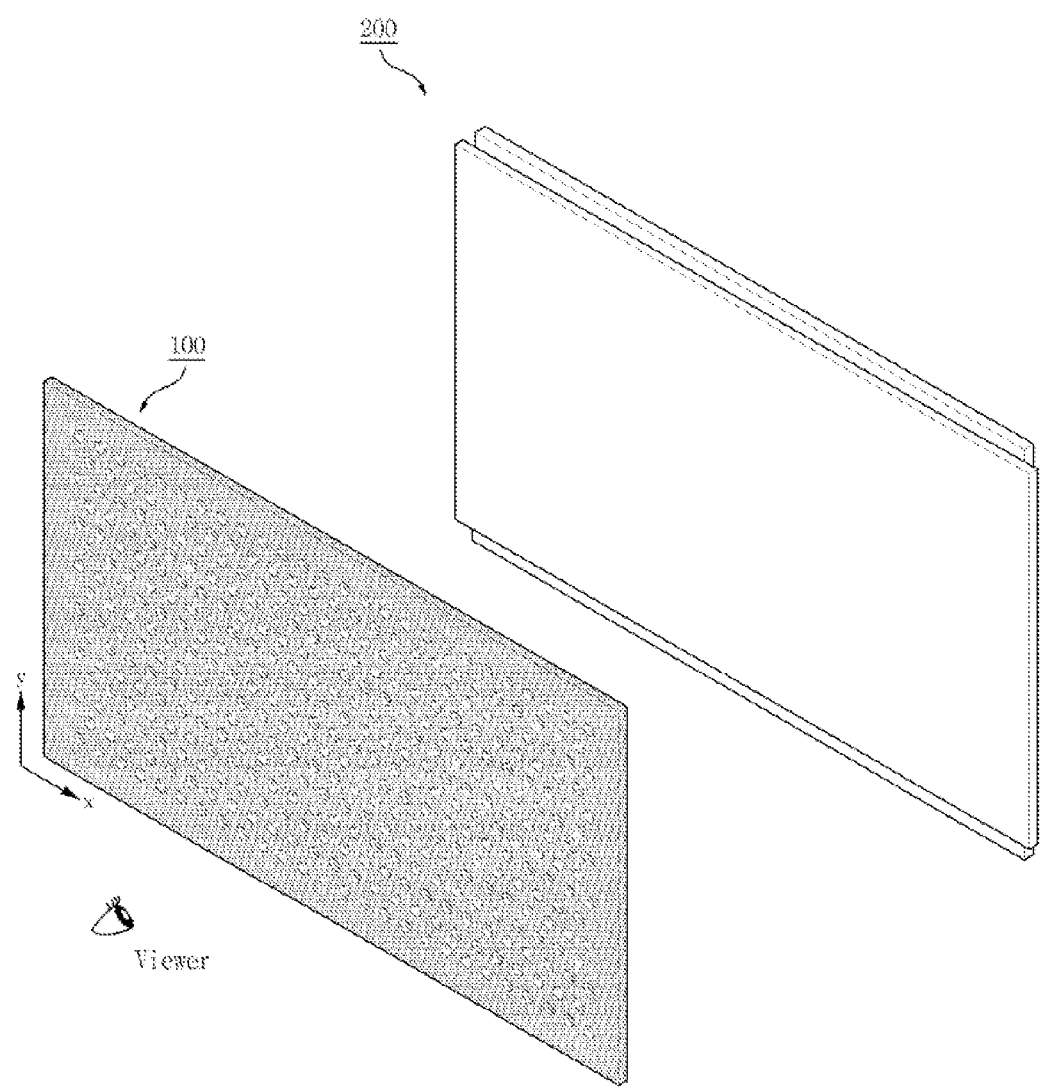
FIG. 3 is a view of illustrating a construction of a plasma display apparatus according to yet another embodiment of the present invention.

FIG. 3 is a view of illustrating a construction of a plasma display apparatus according to yet another embodiment of the present invention.

As shown in FIG. 3, the plasma display apparatus according to yet another embodiment of the present invention may comprise a plasma display panel 200 and a display apparatus filter 100.

The plasma display panel 200 comprises a plurality of electrodes and driving units as described above. The driving units apply a driving voltage to these electrodes to create a discharge, thereby displaying images.

The display apparatus filter 100 is disposed at the front surface of the panel 200 and comprises a light transmission unit and a light absorption unit, each of which is disposed over the whole surface of the filter 100. The light transmission unit has a plurality of holes arranged thereon, each of which has gradually increasing opening area as the filter 100 goes from its front surface to its rear surface. The light absorption unit is formed on the parts other than the part where the plurality of holes are positioned. The light transmission unit of the filter according to the embodiment of FIG. 3 may comprise a plurality of holes, each having a circular section. The structure of this display apparatus filter 100 will be detailed later with reference to FIG. 4.

Figure 4:
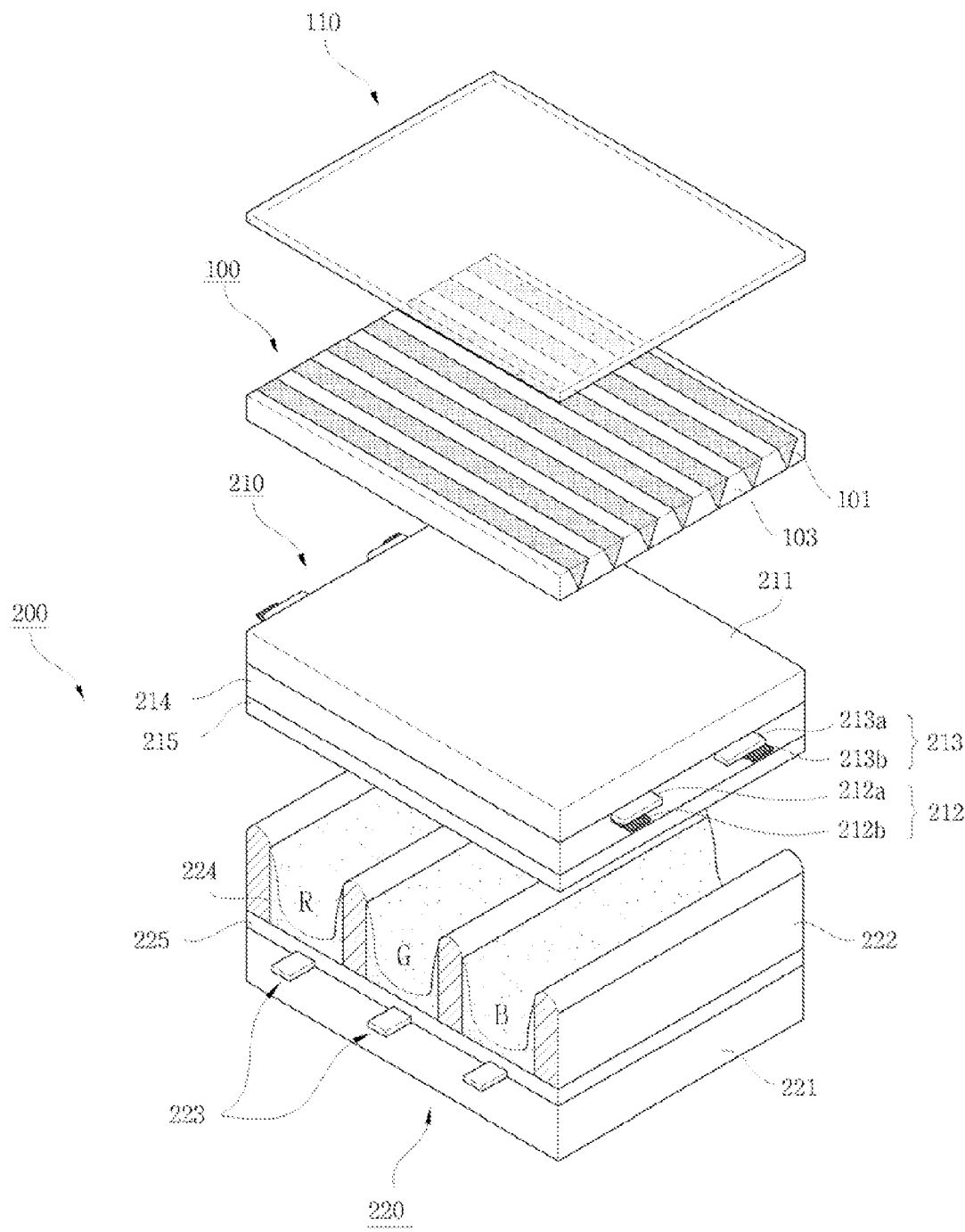
FIG. 4 is a stereograph of a plasma display apparatus according to an embodiment of the present invention.

FIG. 4 is a stereograph of a plasma display apparatus according to an embodiment of the present invention.

As shown in FIG. 4, the plasma display apparatus according to yet another embodiment of the present invention may comprise a plasma display panel 200 and a display apparatus filter 100.

First, as an example, the plasma display panel comprises a front panel 210 and a rear panel 220 which are coupled in parallel to be opposed to each other at a given distance therebetween. The front panel 210 comprises a front substrate 211 being a display surface on which images are displayed, and the rear panel 220 comprises a rear substrate 221 being a rear surface. Scan electrodes 212 and sustain electrodes 213 are formed in pairs on the front substrate 211 to form a plurality of maintenance electrode pairs. A plurality of data electrodes 223 are arranged on the rear substrate 221 to intersect the plurality of maintenance electrode pairs.

The front panel 210 may comprise a pair of a scan electrode 212 and a sustain electrode 213 for causing a reciprocal discharge to occur at a discharge cell and maintaining the light emission of the discharge cell. The scan electrode 212 and sustain electrode 213 each are composed of a transparent electrode (a) made of a transparent ITO material and a bus electrode (b) made of a metallic material. The scan electrode 212 and sustain electrode 213 each may be formed only of either transparent electrodes (a) or bus electrodes (b). The scan electrode 212 and sustain electrode 213 are covered with one or more upper dielectric layers 214 which serve to confine the discharge current and insulate between the electrode pairs. And, a protective layer 215, which are deposited by, e.g. MgO, is formed on the upper dielectric layers 214 to mitigate the conditions for discharge.

A stripe-type or well-type of barrier ribs 220 are arranged in parallel with one another on the rear panel 220, e.g. in order to form a plurality of discharge spaces, i.e. discharge cells. In addition, a plurality of data electrodes 223 are arranged in parallel with the barrier ribs 222 to generate an address discharge, thereby radiating vacuum ultraviolet rays. R, G, and B phosphors 224 are applied on the upper surface of the rear panel 220 to emit visible rays for displaying images upon an address discharge. A lower dielectric layer 225 is formed between the data electrodes 223 and phosphors 224 to protect the data electrodes 223.

The thusly formed front panel 210 and rear panel 220 are combined to each other by sealing process to form a plasma display panel. Then, driving units (not shown) are added to the plasma display panel to drive the plurality of electrodes, such as the scan electrodes 212, sustain electrodes 213, and data electrodes 223, and a filter 100 is arranged at the front surface of the plasma display panel 200, thus completing a plasma display apparatus.

The display apparatus filter 100 is disposed at the surface of the plasma display panel 200, and may comprise a light transmission unit 103 and a light absorption unit 101, each of which is disposed over the whole surface of the filter 100. The light transmission unit 103 has a plurality of holes arranged thereon, each of which has gradually increasing opening area as the filter 100 goes from its front surface to its rear surface. The light absorption unit 101 is formed on the parts other than the part where the plurality of holes are positioned.

The light transmission unit 103 may comprise the holes, whose each opening area increases as the filter 100 goes from its front surface to its rear surface. The opening area at the front surface of the filter 100 is adjusted to be more than $\frac{1}{30}$ and less than $\frac{1}{5}$ of that at its rear surface, so that the transparency of images can be optimized. Moreover, the width of the hole is adjusted to be more than 1 μm and less than 900 μm so that its contrast characteristic can be optimized. Meanwhile, the light transmission unit 103 may comprise a transparent resin for filling the inside of the holes. The transparency of the images to be displayed by the display panel 200, i.e. internal lights, can be improved by making the refractive index of the transparent resin 103 greater than that of the light absorption unit 101.

The light absorption unit 101 can be made to have gradually decreasing opening area as the filter 100 goes from its front surface to its rear surface to prevent external light from reflecting to thereby improve the contrast characteristic and raise the transparency of internal lights. As a result, brightness can be improved. This light absorption unit 101 can be formed of any one of a black paint, a black resin, carbon black, a conductive black polymer or a melanized metal not to reflect but to absorb the external light effectively.

Furthermore, at least one or more of functional films 110 including an near-infrared blocking film, a color correction film, a anti-reflection film, or electronic wave interference blocking film can be provided on either front surface or rear surface of the filter 100. While the plurality of functional films 110 are disposed at the front surface of the filter 100 in FIG. 4, the functional films 110 can be disposed at both the front surface and rear surface of the filter 100.

Figure 5A:
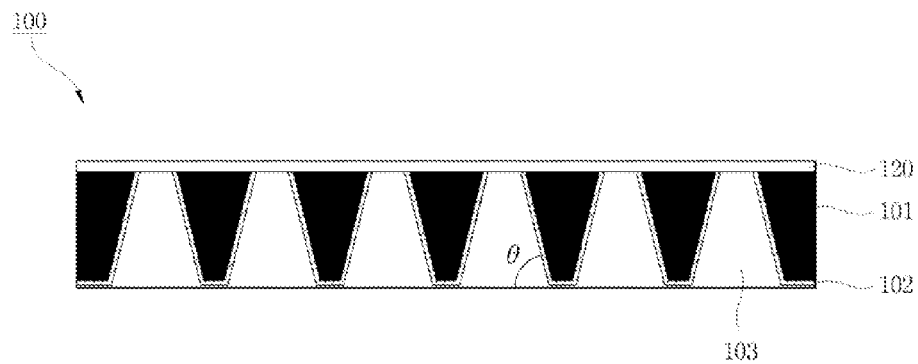
FIGS. 5a to 5c each are a cross sectional view for illustrating a display apparatus filter according to the first to third embodiments of the present invention.
Figure 5B:
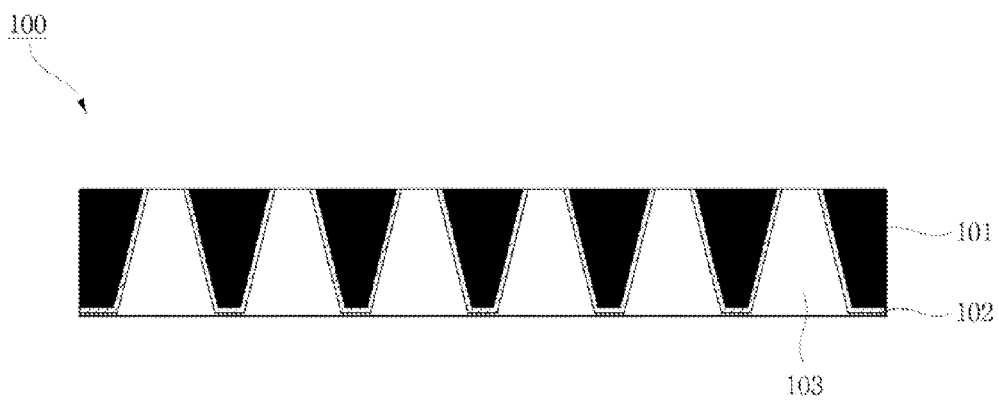
Figure 5C:
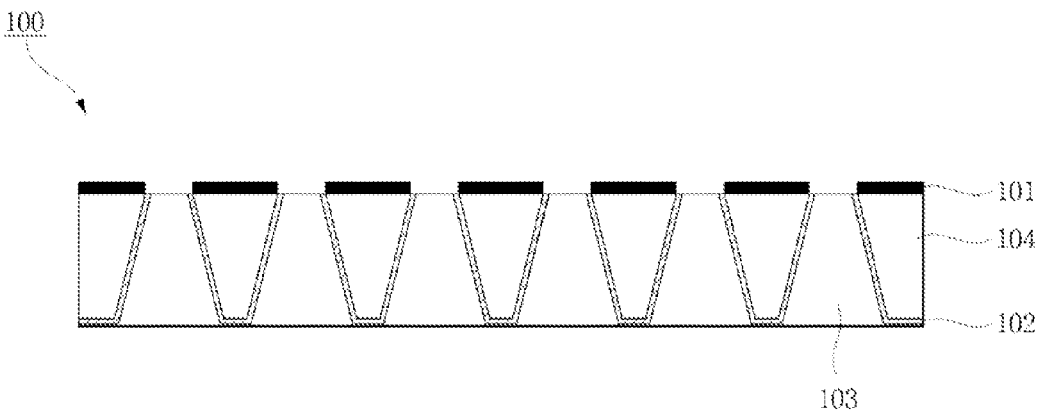

FIGS. 5a to 5c show various embodiments of the display apparatus filter 100 as described above.

FIGS. 5a to 5c each are a cross sectional view for illustrating a display apparatus filter according to the first to third embodiments of the present invention.

In the display apparatus filter 100 according to the first embodiment of the present invention as shown in FIG. 5a, the filter 100 may comprise a light transmission unit 103 and a light absorption unit 101, each of which is disposed over the whole surface of the filter 100. The light transmission unit 103 has a plurality of holes thereon, each having the shape of a truncated cone or a prismoid, which have gradually increasing opening area as the filter 100 goes from its front surface to its rear surface. The light absorption unit 101 is formed on the parts other than the part where the plurality of holes are positioned.

The whole front surface of the filter is coated with a transparent coating layer 120 to be capable of improving the uniformity and preventing the deformation caused by being exposed to the outside. This transparent coating layer 120 may comprise a thermosetting resin or photo curable resin such as an acrylic based resin, a silicon based resin, a melamine based resin, a urethane based resin, a fluorine based resin.

A reflective film 102 can be further provided on the inside of the holes to enhance the brightness of images and improve the contrast characteristic by allowing the light radiated by the display apparatus to transmit maximally the holes disposed at the front surface of the filter 100. The reflective film 102 can be formed of a metallic thin film, which may comprise any one of, e.g., Cu, Ag, or Al to raise the reflectivity. The metallic thin film can function as a electromagnetic wave blocking filter because the holes are arranged in a two dimensional mesh type.

A transparent resin 103 can be further provided to fill the inside of the holes. The transparent resin serves not only as a pathway through which visible rays radiated from the display apparatus can pass but to support the reflective film 102. Therefore, any synthetic resins that are transparent to visible rays as well as that have low absorptiveness and high transmittance can be used as the transparent resin 103. Specifically, the transparent resin 103 may comprise a cellulose based resin such as polyethyleneterephthalate, polyethersulfone, polystyrene, polyethylenenaphthalate, polyarylate, polyetheretherketone, polycarbonate, polyethylene, polypropylene, polyamide, polyimide, triacetylcellulose, a fluorine based resin such as polyurethane, polytetrafluoroethylene, a vinyl compound such as polyvinyle chloride, polyacryle acid, polymetacryle acid, or a copolymer thereof Polyethylene terephth(PET) can also be used in view of transmittance and thermal properties. The opening area at the front surface of the filter 100 is adjusted to be more than $\frac{1}{30}$ and less than $\frac{1}{5}$ of that at its rear surface, so that the transparency of light radiated from the display apparatus can be maximized. In the case that opening area is excessively small, it is difficult of light to transmit and the sharpness of the display apparatus is lessened. On the contrary, in the case that opening area is excessively great, external visible rays are not absorbed sufficiently.

The transparency of images can be optimized when the boundary surface of the hole is angled by more than 65 degrees and less than 85 degrees with respect to the reference surface of the filter 100. Light enters the inside of holes by various angles. Here, in the case that the angle made between the side surface and the bottom surface of the hole is less than 65 degrees, amount of light entering the inside of the display apparatus increases, thereby being capable of reduce brightness. In the case that the angle made between the side surface and bottom surface of the transparent structure is more than 85 degrees, it can be difficult of the transparent structure to be formed.

The light absorption unit 101 can be made to have gradually decreasing opening area as the filter 100 goes from its front surface to its rear surface to block the external light to thereby improve the contrast characteristic and raise the transparency of internal lights. As a result, brightness can be improved. This light absorption unit 101 can be formed of any one of a black paint, a black resin, carbon black, a conductive black polymer or a melanized metal not to reflect but to absorb the external light effectively. The light absorption unit according to the embodiment employs carbon black as its main component, which is mixed with a binder resin to complete the light absorption unit. Besides, the light absorption unit can comprise Cr, chrome oxide, graphite, etc. as its main component, which have high absorptiveness of visible rays.

A liquid composition including carbon black is applied on the metallic thin film and then secured to form the light absorption unit 101.

In the display apparatus filter 100 according to the second embodiment of the present invention as shown in FIG. 5b, the filter 100 may comprise a light transmission unit 103 and a light absorption unit 101, each of which is disposed over the whole surface of the filter 100. The light transmission unit 103 has a plurality of holes thereon, each having the shape of a truncated cone or a prismoid, which have gradually increasing opening area as the filter 100 goes from its front surface to its rear surface. The light absorption unit 101 is formed on the parts other than the part where the plurality of holes are positioned.

The second embodiment doesn't provide the transparent coating layer 120 unlike the first embodiment, which can facilitate to manufacture the filter 100. The other construction of the second embodiment is equal to that of the first embodiment and thus its detailed description will not be given here.

In the display apparatus filter 100 according to the third embodiment of the present invention as shown in FIG. 5c, the filter 100 may comprise a light transmission unit 103 and a light absorption unit 101, each of which is disposed over the whole surface of the filter 100. The light transmission unit 103 has a plurality of holes thereon, each having the shape of a truncated cone or a prismoid, which have gradually increasing opening area as the filter 100 goes from its front surface to its rear surface. The light absorption unit 101 is formed on the parts other than the part where the plurality of holes are positioned.

A reflective film 102 can be further provided on the inner surface of the holes and a transparent resin 103 can be further provided to fill the inside of the holes. In addition, in the third embodiment, a resin part 104 can be further provided between the outer surface of the plurality of holes and the light absorption unit 101. That is, the light absorption unit 101 can serve to block the external light by providing a thin film at the front surface of the filter 100. The other construction of the second embodiment is equal to that of the first embodiment and thus its detailed description will not be given here.

Figure 6A:
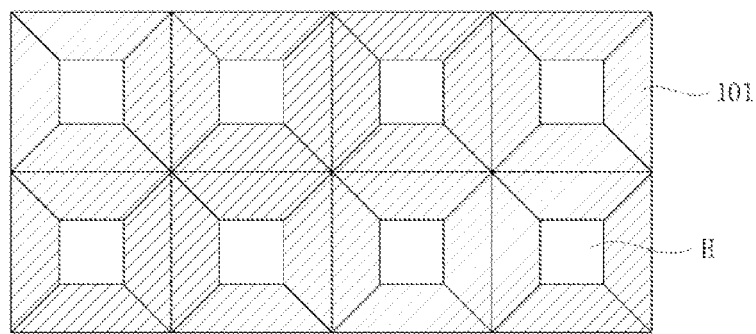
FIGS. 6a and 6b each are a plan view of illustrating a display apparatus filter according to each embodiment of the present invention.
Figure 6B:
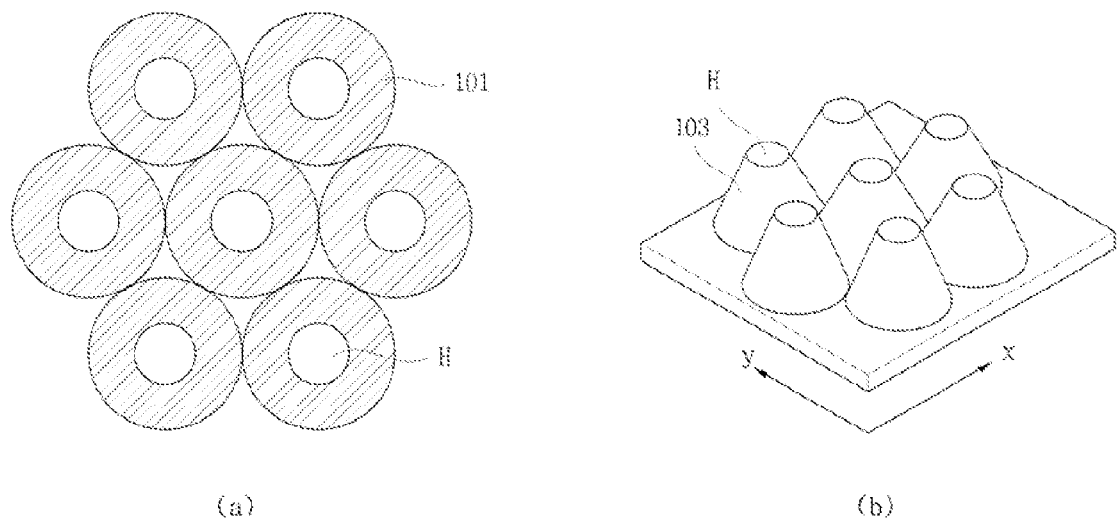

FIGS. 6a and 6b each are a plan view of illustrating a display apparatus filter according to each embodiment of the present invention.

Referring to FIGS. 6a and 6b, which illustrate a display apparatus filter 100 looked down from above, it can be seen how the holes (H) of the light transmission unit 103 and light absorption unit 101 are shaped and configured. It can be seen in FIG. 6a that the light transmission unit 103 is configured to have holes (H), each having the shape of a truncated quadrangular pyramid. Here, the hole (H) has the shape of a square or may have the shape of a rectangle as in FIG. 2a.

It can be seen in FIG. 6b(a) that the light transmission unit 103 is configured to have holes (H), each having the shape of a truncated cone. FIG. 6b(b) shows the shape of the light transmission unit 103 of FIG. 6b(a); this light transmission unit 103 has the corresponding structure to that of the display apparatus filter 100 of FIG. 3.

Figure 7:
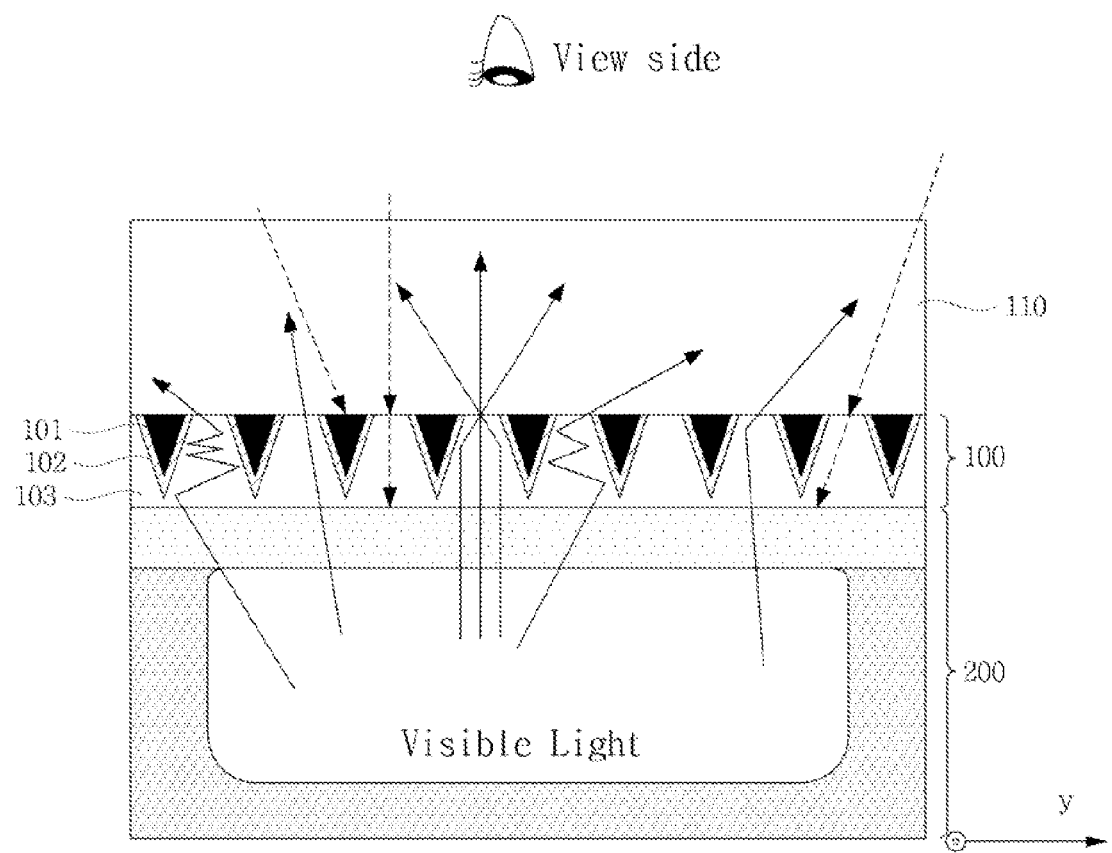
FIG. 7 is a view for illustrating a function of a display apparatus filter according to the present invention.

FIG. 7 is a view for illustrating a function of a display apparatus filter according to the present invention.

As shown in FIG. 7, the display apparatus filter 100 according to the present invention is disposed at the front surface of the panel 200 and comprises a light transmission unit and a light absorption unit, each of which is disposed on the whole surface of the filter 100. The light transmission unit has a plurality of holes arranged thereon, each of which has gradually increasing opening area as the filter 100 goes from its front surface to its rear surface. The light absorption unit is formed on the parts other than the part where the plurality of holes are positioned.

A reflective film can be further provided on the boundary surface of the light transmission unit.

Furthermore, at least one or more of functional films 110 including an near-infrared blocking film, a color correction film, a anti-reflection film, or electronic wave interference blocking film can be provided on either front surface or rear surface of the filter 100. While the plurality of functional films 10 are disposed at the front surface of the filter 100 in FIG. 7, the functional films 110 can be disposed at both the front surface and rear surface of the filter 100.

The light radiated from the display panel 200 enters inside of the light transmission of the display apparatus filter 100 and reflect on the reflective film to be directed to the outside, which in turn are emitted to the outside through the holes on the light transmission unit, Therefore, the brightness of images can be improved. On the other hand, much of the external light directed to the display panel 200 is absorbed by the light absorption unit, and thereby the dazzling by the reflection of the external light can be prevented and the contrast characteristic can be enhanced.

As a consequence, the display apparatus filter 100 according to the present invention can prevent effectively the lowering of contrast due to the reflection of the external light as well as improve the transparency of the light radiated from the display apparatus.

What is claimed is:

1. A display apparatus filter comprising:
    a light transmission unit having a plurality of holes, the plurality of holes each having gradually increasing opening area as the filter goes from its front surface to its rear surface; and
    a light absorption unit formed on the parts other than the part where the plurality of holes are formed in the front surface of the filter.

2. The display apparatus filter of claim 1, wherein a reflective film is provided on an inner surface of the plurality of the holes.

3. The display apparatus filter of claim 2, wherein the reflective film comprises a metallic thin film.

4. The display apparatus filter of claim 3, wherein the reflective film is formed of any one of Cu, Ag, or Al.

5. The display apparatus filter of claim 1, wherein the area of the light absorption unit decreases as the filter goes from its front surface to its rear surface.

6. The display apparatus filter of claim 1, further comprising a resin part provided between the outer surface of the plurality of holes and the light absorption unit.

7. The display apparatus filter of claim 1, further comprising a transparent resin for filling the inside of the holes.

8. The display apparatus filter of claim 7, wherein a refractive index of the transparent resin is greater than that of the light absorption unit.

9. The display apparatus filter of claim 1, wherein each hole has a circular section.

10. The display apparatus filter of claim 1, wherein each hole has a rectangular section.

11. The display apparatus filter of claim 1, wherein at least one or more of a near-infrared blocking film, a color correction film, a anti-reflection film, or electronic wave interference blocking film are provided on the front surface or rear surface of the filter.

12. The display apparatus filter of claim 1, wherein a boundary surface of each hole is angled by more than 65 degrees and less than 85 degrees with respect to a reference surface of the filter.

13. The display apparatus filter of claim 1, wherein an opening area of the front surface of the filter is more than 1/30 and less than 1/5 of that of its rear front.

14. The display apparatus filter of claim 1, wherein the light absorption unit is formed of any one of a black paint, a black resin, carbon black, a conductive black polymer or a melanized metal.

15. The display apparatus filter of claim 1, wherein a width of each hole is more than 1 μm and less than 900 μm.

16. A plasma display apparatus comprising:
a plasma display panel; and
a display apparatus filter of claim 1, the display apparatus filter provided at a front surface of the plasma display panel.

17. The plasma display apparatus, wherein a reflective film is provided on an inner surface of the plurality of holes.

18. A display apparatus filter comprising:
a light transmission unit having a plurality of holes thereon, each having the shape of a truncated cone or a prismoid and having gradually increasing opening area as the filter goes from its front surface to its rear surface;
a light absorption unit formed on the parts other than the part where the plurality of holes are formed in the whole surface of the filter; and
a transparent resin for filling an inside of the holes.

19. The display apparatus filter of claim 18, wherein a reflective film is provided on an inner surface of the plurality of holes.

20. The display apparatus filter of claim 18, wherein an opening area of the front surface of the filter is more than 1/30 and less than 1/5 of that of its rear front.

* * * * *